United States Patent [19]

Pendergraft et al.

[11] Patent Number: 4,756,900
[45] Date of Patent: Jul. 12, 1988

[54] RECYCLING OF WASTE HEAT BOILER EFFLUENT TO AN OXYGEN-ENRICHED CLAUS REACTION FURNACE

[75] Inventors: Paul T. Pendergraft; Gary M. Bond, both of Tulsa, Okla.

[73] Assignee: Amoco Corporation, Chicago, Ill.

[21] Appl. No.: 3,094

[22] Filed: Jan. 14, 1987

[51] Int. Cl.$^4$ ............................................ C01B 17/04
[52] U.S. Cl. .................................................. 423/574 R
[58] Field of Search .................... 423/574 R; 422/171, 422/190, 235

[56] References Cited

U.S. PATENT DOCUMENTS

| | | | |
|---|---|---|---|
| 3,681,024 | 8/1972 | Hujsak et al. | 423/574 R |
| 4,391,790 | 7/1983 | Palm et al. | 423/574 R |
| 4,391,791 | 7/1983 | Palm et al. | 423/574 R |
| 4,552,747 | 11/1985 | Goar | 423/574 R |
| 4,684,514 | 8/1987 | Chen | 423/574 R |

OTHER PUBLICATIONS

"Look at Claus Unit Design", Parnell, Hydrocarbon Processing, 9-1985, pp. 114-118.
Unit Processes and Principles of Chemical Engineering, Olsen Van Nostrand Co., Inc., 1932, pp. 1-3.

Primary Examiner—John Doll
Assistant Examiner—Jeffrey Edwin Russel
Attorney, Agent, or Firm—L. Wayne White; Scott H. Brown

[57] ABSTRACT

A system and method of use thereof are disclosed for recovering sulfur from a feed gas stream containing hydrogen sulfide which is combusted with an oxygen-enriched gas in a Claus reaction furnace. Within the method, combustion effluent from a waste heat boiler associated with the Claus reaction furnace is divided into a first and second stream so that the sulfur in the first stream is condensed and then the stream is passed on to later Claus reaction stages, and the sulfur in the second stream is condensed and then this stream is introduced into the Claus reaction furnace to moderate the temperatures therein.

6 Claims, 1 Drawing Sheet

RECYCLING OF WASTE HEAT BOILER EFFLUENT TO AN OXYGEN-ENRICHED CLAUS REACTION FURNACE

BACKGROUND OF THE INVENTION

1. Field of the Invention

The present invention relates to the recovery of elemental sulfur from a stream of hydrogen sulfide containing gas and, more particularly, the present invention uses recycle gas to moderate the temperature within a Claus reaction furnace.

2. Setting of the Invention

It is well known to remove elemental sulfur from a stream of hydrogen sulfide containing gas using a Claus reaction furnace to combust a portion of the hydrogen sulfide to sulfur dioxide which is then thermally or catalytically reacted to product elemental sulfur. Occasionally, an existing sulfur recovery plant is modified to increase the capacity of the Claus reaction furnace to handle hydrogen sulfide by adding an oxygen-enriched gas to the air feed. U.S. Pat. No. 3,681,024 describes a process that uses oxygen enrichment wherein a portion of the effluent gas from the downstream portion of the plant is recycled to the Claus reaction furnace to control the temperature therein. U.S. Pat. No. 4,552,747 describes another process that uses oxygen enrichment wherein a portion of the effluent from a sulfur condenser downstream of the Claus reaction furnace is recycled to control the temperature therein.

The inventors hereof have found that in some instances an unacceptably large pressure drop across the unit can occur, especially across the first condenser unit. Also, the effluent flow rate and temperature from the condenser used in recycling can be higher than desired, necessitating the use of more expensive valves and a larger capacity blower.

Other problems associated with the process of U.S. Pat. No. 4,552,747 is that if the condenser effluent temperature is lowered to facilitate recycling, then overall sulfur recovery can be reduced when hot gas bypass or acid gas fired in-line burners are used to reheat the feed to the subsequent reactor because a greater portion of the rich process gas is introduced into the reactor. If a non-fired indirect heater is used, instead of hot gas bypass or acid gas fired in line burner, then no heat source adequate for heating the effluent to operating temperature of the first reactor is present.

If, on the other hand, the temperature of the first condenser's effluent is not reduced, then a larger blower for recycling will be required, more expensive materials will be required, and maintenance requirements will be greater.

There exists a need for a method of recovering sulfur which utilizes oxygen-enriched air in the Claus reaction furnace and which utilizes recycle gas for temperature moderation which reduces or eliminates the above-described disadvantages of the prior art processes.

SUMMARY OF THE INVENTION

The present invention has been developed to overcome the above-described deficiencies and meet the above-described needs. The present invention provides a method of recovering elemental sulfur from a feed gas stream containing hydrogen sulfide which is combusted with oxygen-enriched gas in a Claus reaction furnace. In the present method the effluent from a waste heat boiler associated with the Claus reaction furnace is divided into a first and a second stream with the first stream being introduced into a first condensation zone for cooling and condensation and removal of elemental sulfur. The effluent from the first condensation zone is then introduced into at least one stage, and preferably two or more stages of Claus catalytic sulfur formation and recovery, including, for example, the steps of reheating, conversion in Claus catalytic reaction zones, and introduction into additional condensation zones for the recovery of sulfur. Alternately, the effluence can be introduced into the operation of the Claus catalytic reaction zone at temperatures effective for depositing a preponderance of sulfur formed on catalyst with subsequent regeneration of the catalyst and recovery of elemental sulfur.

The second stream is introduced into a second condensation zone for cooling and condensation and removal of elemental sulfur, and the effluent from the second condensation zone is introduced via a recycle blower into the Claus reaction furnace zone to moderate the temperature therein. By removing the recycle stream prior to the first condensing zone and passing it through a second condensing zone, the pressure drop across the first condensing zone is greatly reduced, the temperature of the effluent being recycled is within prudent limits, and the size and temperature requirements for the recycle blower can be less than that required by the prior art methods. The operation of a Claus catalytic reaction zone above or below the sulfur dewpoint, the formation and recovery of sulfur, and the regeneration of catalyst are all well-known to those skilled in the art and need not be described in detail within this application.

BRIEF DESCRIPTION OF THE DRAWING

The drawing illustrates a schematic view of a Claus sulfur plant that uses oxygen-enriched air and a recycle stream of the present invention. Similarly, numbered apparatus elements act similarly to each other and the letter following a number denotes the stage location.

DETAILED DESCRIPTION OF THE PREFERRED EMBODIMENT

Figure 1:
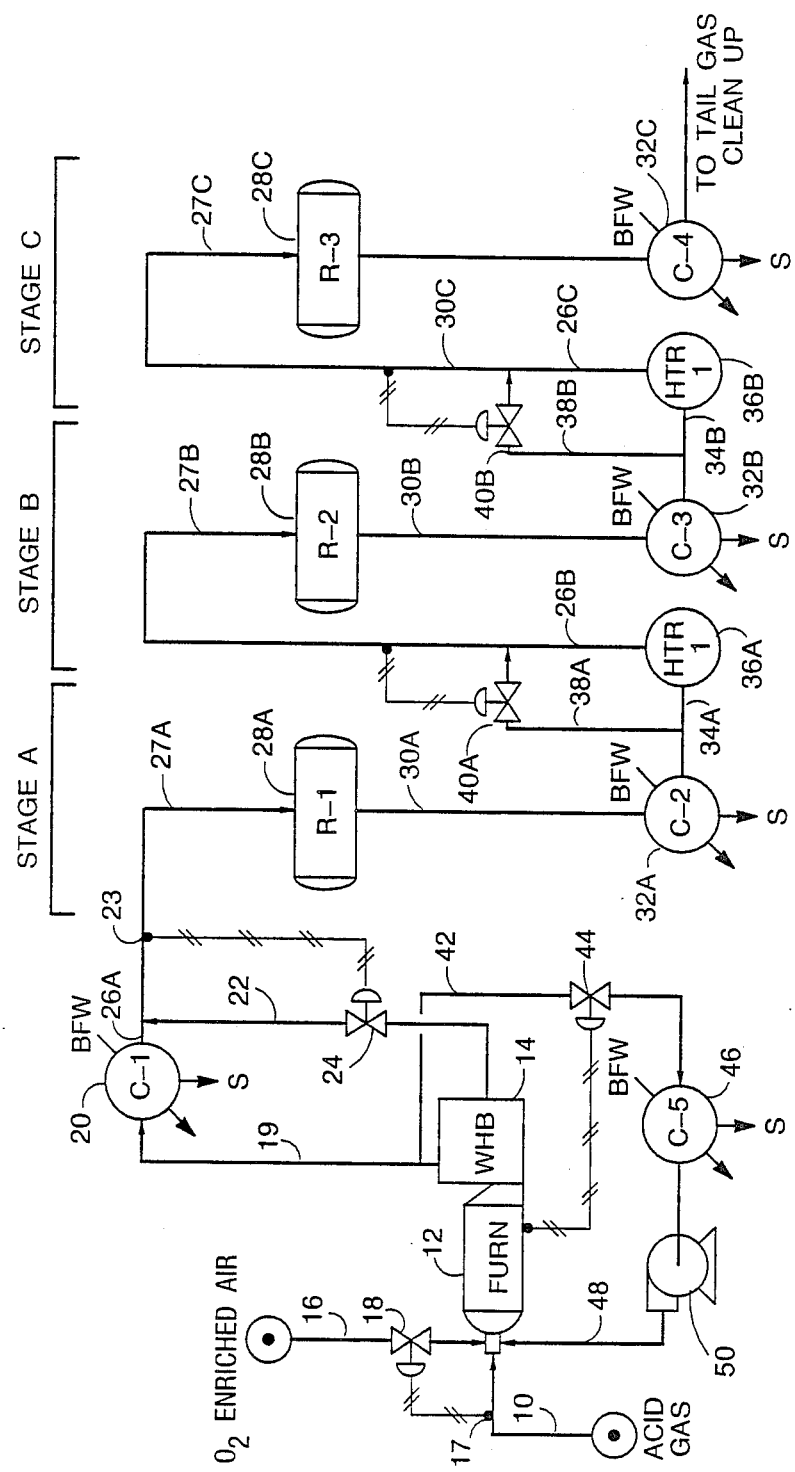

The present invention provides a system and method of use for removing sulfur from a feed gas stream containing hydrogen sulfide. In this system, a Claus reaction furnace is utilized for partially combusting the feed gas stream with an oxygen-enriched gas. The combustion effluent from a waste heat boiler associated with a Claus reaction furnace is divided into a first and a second effluent stream with the first stream being introduced into a first condensation zone for cooling, and condensation and removal of elemental sulfur. The effluent from the first condensation zone can be introduced into at least one Claus stage where it is reheated and where sulfur is formed in a catalytic Claus reaction zone and removed in a sulfur condensation zone. Alternately or subsequently, effluent can be directed to a Claus catalytic reaction zone at temperatures effective for depositing the preponderance of sulfur formed on catalyst with subsequent regeneration of the catalyst and recovery of elemental sulfur. The second effluent stream is recycled into a second condensation zone for cooling and removal of elemental sulfur, and introduction into the Claus reaction furnace to moderate the temperature therein.

The present invention overcomes the disadvantages of the prior art processes by providing a separate condensing zone for the recycle stream taken prior to the first condensing zone. This separate condensing zone can be designed to have an effluent temperature that is lower than that of the first condensing zone. Since the second condensing zone is utilized only on the recycle stream, it can produce low pressure steam which can then be condensed in a air cooler and recycled to the condensate system. Another option is to use the second condensing zone to preheat boiler feed water that can be passed to one or more downstream condensers so that the contained heat will not be lost.

Sending the recycle stream through the second condensing zone also allows the effluent to be introduced into the recycle blower at a lower temperature, thereby increasing the life expectancy of the blower and also reducing maintenance costs. Reducing the temperature of effluent entering the blower also reduces the horsepower requirement of the blower.

Another advantage to having a lower temperature for the recycle stream is that it decreases the rate of recycle gas required to moderate the furnace temperatures. The cooler the moderating gas, the less of it that is required. By reducing the temperature of the recycled gas, not only will the blower horsepower be reduced due to a lower temperature, but also a lower flow rate will be needed as well. Another method of reducing the blower horsepower requirement will be to design the second condensing zone so that it has a pressure drop less than that of the pressure drop through the first condensing zone if all of the effluent were to be fed through the first condensing zone. A reduction in blower size and temperature requirement and thereby lower maintenance requirements can thus offset the cost of the additional condensing zone.

In reference to the Drawing, a gas stream containing hydrogen sulfide is introduced through a line 10 into a Claus reaction furnace 12 having an accompanying waste heat boiler 14, as is well known to those skilled in the art. Boiler feed water is introduced into the waste heat boiler 14 and high pressure steam can be removed for use elsewhere and/or cooled and condensed to produce water for use elsewhere, again as is well known in the art. Within the Claus reaction furnace, hydrogen sulfide and oxygen from a line 16 are combined to produce sulfur dioxide and water (approximately one-third of the hydrogen sulfide is initially combusted). A portion of the remaining $H_2S$ reacts with the sulfur dioxide produced to produce sulfur and water. The ratio of acid gas to oxygen-enriched gas introduced into the Claus reaction furnace can be manually or mechanically/automatically adjusted through the use of a flow meter 17 on line 10 used to control a throttling valve 18 on line 16.

The effluent from the second pass of the waste heat boiler 14 passes through a line 19 to a first condenser 20 wherein the effluent is cooled and elemental sulfur (S) is condensed and removed. Bypass gas reheat is used to reheat the effluent from the first condenser 20 by way of line 22 from the first pass of the waste heat boiler 14 and is controlled by the operation of a temperature controller 23 on a line 26A to control a valve 24. The effluent from the first condenser 20 is removed through the line 26A to a Claus train or stage, labeled Stage A, wherein the effluent through a line 27A is introduced into a catalytic converter reactor 28A wherein additional quantities of hydrogen sulfide and sulfur dioxide are reacted to produce sulfur and water. Effluent exiting the catalytic converter reactor 28A passes through a line 30A to an additional condenser 32A, which again cools the effluent to produce additional steam and wherein elemental sulfur is condensed and removed.

The effluent from the condenser 32A is passed through a line 34A to a reheater exchanger 36A to be heated before introduction through lines 26B and 27B into the subsequent Claus stages. The temperatures of the effluents in lines 26B and 26C is controlled by bypass lines 38A and 38B that includes manually or mechanically/automatically adjusted valves 40A and 40B, as is well known in the art.

The process of the present invention can include a single Claus stage, and preferably includes at least two or more Claus stages, as shown in the drawing. The subsequent Claus stages can be the same as or different from Claus Stage A. Alternatively or subsequently, effluent can be passed to a Claus catalytic reaction zone at temperatures effective for depositing a preponderance of sulfur formed on catalyst with subsequent regeneration of the catalyst and recovery of elemental sulfur. The effluent from the last condenser 32C is passed to a tail gas cleanup unit (TGCU), an incinerator, or a portion can be recycled back into the Claus reaction furnace 12.

A portion of the effluent from the waste heat boiler 14 is recycled into the Claus reaction furnace 12 to moderate the temperatures therein as desired in the following manner. A valve or a T connector is connected to line 19 to pass a portion of the effluent through a line 42, a throttling valve 44, to a second condenser 46. Elemental sulfur is condensed and removed within the second condenser 46; however, primarily the second condenser 46 is used to cool the effluent which is then passed through a line 48 and a blower 50 into the Claus reaction furnace 12. As is described above, by varying the temperature, pressure and volume of the recycle gas passing through lines 42 and 48, temperature moderation can be achieved. Thus, lower blower horsepower and the more favorable environmental conditions to the blower are developed, as well as the pressure drop across the first condenser 20 is greatly reduced.

The steam produced by the waste heat boiler 14 and any or all of the condensers 20, 32A, 32B, 32C, and 46 can be used to preheat any or all of the boiler feed water (BFW) to be used in the waste heat boiler 14 and/or any or all of the above-identified condensers. Note that the steam from the condenser 20 can be at a higher pressure than that from condenser 46. Further, the steam produced by the waste heat boiler 14 and any or all of the condensers 20, 36A, 36B, 36C, and 46 can be used for process heating, power generation, or cooled and condensed to produce water which is added to the boiler feed water of the waste heat boiler 14 and/or any or all of the above-identified condensers.

Typically, the quantity of hydrogen sulfide within the feed stream is 10–100 volume %, and is preferably 30 to 100 volume % because this is normal range for Claus plants.

The temperature of the effluent in line 19 is from about 300° F. to about 1000° F. and is preferably from about 500° F. to about 600° F. because this is the normal operating temperature of Claus plant WHB effluent. Also, the waste heat boiler is normally designed such that the effluent temperature is well above the sulfur dew point. The temperature of the effluent in line 27A is from about 260° F. to about 500° F. and is preferably from about 350° F. to about 450° F. because low temperatures require a larger condenser and more reheat. The lower temperatures may allow a slight increase in the overall plant sulfur recovery if indirect reactor feed reheat is used, but if direct reheat is used, such as hot gas bypass from the waste heat boiler or as the use of an acid gas fired inline burner, the increase in the amount of reheat required may actually reduce the overall plant sulfur recovery. The temperature of the effluent from the condenser 46 is from about 200° F. to about 350° F. (effluent temperatures below the sulfur freezing point would be possible by using a condenser configuration similar to that discussed in U.S. Pat. No. 4,391,791), and preferably from about 240° F. to about 300° F. because the lower temperatures remove more elemental sulfur and reduces blower horsepower and material requirements.

Wherein the present invention has been described in particular relation to the drawings attached hereto, it should be understood that other and further modifications, apart from those shown or suggested herein, may be made within the scope and spirit of the present invention.

What is claimed is:

1. A method of recovering sulfur from a feed gas stream containing hydrogen sulfide combusted with an oxygen-enriched gas in a Claus reaction furnace zone, comprising:
    dividing combustion effluent as it is received directly from a waste heat boiler associated with the Claus reaction furnace zone into a first and a second stream;
    introducing the first stream into a first condensation zone for cooling, and condensation and removal of sulfur;
    introducing effluent from the first condensation zone into at least one stage of sulfur formation and recovery in a catalytic Claus reaction zone;
    introducing the second stream into a second condensation zone for cooling, and condensation and removal of sulfur, wherein the temperature of the effluent of the second condensation zone is less than the temperature of the effluent of the first condensation zone; and
    introducing effluent from the second condensation zone into the Claus reaction furnace zone to moderate the temperatures therein.

2. The method of claim 1 and including introducing water from the second condensation zone to the first condensation zone for use as boiler feed water.

3. The method of claim 1 wherein the temperature of the effluent of the second condensation zone is from about 240° F. to about 300° F.

4. The method of claim 1 wherein the effluent from the first condensation zone is heated by a third stream of combustion effluent from the waste heat boiler.

5. The method of claim 1 wherein the effluent from the first condensation zone is heated by at least one acid gas fired in-line burner.

6. A process for recovering sulfur from a feed gas stream containing hydrogen sulfide wherein the gas stream is partially combusted with an oxygen-enriched gas in a Claus reaction furnace zone, the combustion effluent is cooled with the attendant condensation and separation of sulfur in one or more condensation zones and the remaining effluent streams passed through at least one stage of reheating, conversion in a catalytic Claus reaction zone and cooling with attendant condensation separation of sulfur in an additional condensation zone, the improvement comprising:
    dividing combustion effluent as it is received directly from a waste heat boiler associated with the Claus reaction furnace zone into a first and a second stream;
    introducing the first stream into a first condensation zone for cooling, and condensation and removal of sulfur;
    introducing effluent from the first condensation zone into at least one stage of sulfur formation and recovery in a catalytic Claus reaction zone;
    introducing the second stream into a second condensation zone for cooling, condensation and removal of sulfur, wherein the temperature of the effluent of the second condensation zone is less than the temperature of the effluent of the first condensation zone;
    introducing effluent from the second condensation zone into the first Claus reaction furnace zone to moderate the temperature therein.

* * * * *